Dec. 22, 1953  E. RIEDEL  2,663,427
INSTALLATION FOR DEWATERING SLIMES
Filed May 17, 1950
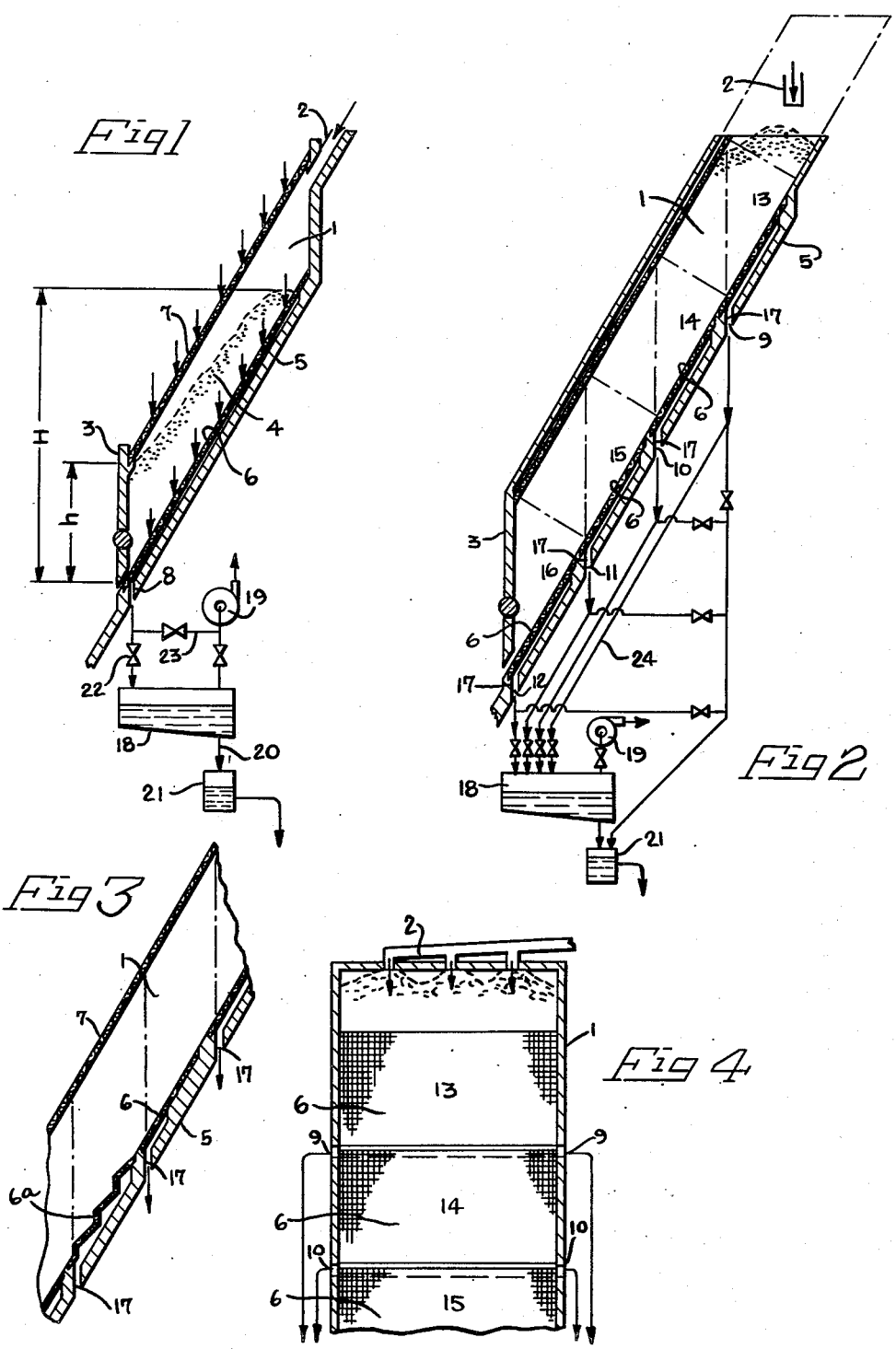

Patented Dec. 22, 1953

2,663,427

UNITED STATES PATENT OFFICE 2,663,427

INSTALLATION FOR DEWATERING SLIMES

Erich Riedel, Dusseldorf, Germany, assignor to Brueckenbau Flender G. m. b. H., Dusseldorf, Germany, a German corporation Application May 17, 1950, Serial No. 162,535
Claims priority, application Germany
August 5, 1949

4 Claims. (Cl. 210—149)

This invention relates to the separation of water from fine materials, and particularly from coal fines.

This separation is often carried-out in towers or bunkers the water being caused to flow-off or drop from the coal particles by gravity.

Since the removal of the water in these dewatering bunkers and dewatering towers is slow and incomplete a preliminary water removal by traveling scoops or stationary or mechanically actuated reciprocating or vibrating screens is often combined with the final dewatering step. Sometimes, the preliminary water removal is performed in overflow troughs. The thus pretreated fines are then processed for the final water removal in vertical towers.

The drawbacks of the water separation in vertical towers or bunkers are large space requirements, high building costs, slow operation and poor efficiency.

Therefore many attempts have been made to improve the operation of the dewatering towers or bunkers.

For this purpose, filter tubes have been used in combination with the towers, for instance, located in the center portion thereof; moreover, vertical single and multiple filters have been applied to the tower walls.

The filtering surface has been vertically arranged, the water flowing off in the natural direction of gravity, i. e. vertically, too. This means that the flow of water and the surface of the filter have been parallel, while they should be inclined towards each other in an angle of 90° or at least less than 90° for giving the best dewatering results. Moreover, the lower layers of the charge were continuously enriched with water which originated from the higher layers and the amount of residual moisture increased in the downward direction of the towers.

This drawback was not avoided by the installation of inclined bottoms in the towers because in these high vertical towers the down-flow of the water is greatly impeded by superposed layers within the charged fines.

Moreover, the height of the charge equals in these towers more or less the height of the tower and both are equal to the length of the vertical path through which the water flows.

It is apparent that by an increase of the height of the charge the length of the water path is also increased; accordingly, the difficulties of the dewatering operation in vertical towers will increase in proportion to their height and to the height of the charge.

Attempts have also been made to eliminate this calamity by the location in the towers of telescopically extensible tubes for the purpose of improving thereby the discharge of the fines; however, the installation of these tubes proved to be difficult and the dewatering time was not shortened.

It has also been tried to counteract the accumulation of water in the lower zones of the charge by application therein of reduced pressure; also this measure proved to be inefficient, since removal of the water can be only successfully effected if air is allowed to pass from above through the charge. Difficulties also arose with regard to this vacuum work from the great height of the towers or bunkers; the slight improvement in the water removal resulting from reduction of the air pressure did not appreciably improve the economy of the work.

It is therefore the main object of this invention to provide an apparatus for dewatering fine coal whereby a practically complete separation of its components viz., fine coal and water is achieved.

It is another object of the invention to obtain this result with very simple structural means.

It is another object of the invention to greatly improve the economy of the dewatering installations.

It is also an object of the invention to produce practically dry coal fines which are free from wet surface films.

It is another object of the invention to improve the operational safety of the dewatering devices and to eliminate their reactivity to different loads.

In compliance with these various objects the hitherto customary vertical separating towers or bunks are replaced by inclined chutes of which the angle of inclination is greater than the angle of repose of the coal slimes and where the vertical dewatering path through the charge will be always smaller than its total height; this is in full contradistinction to the above referred-to vertical dewatering towers where, as stated, these two working conditions equal each other.

In conformity with a further modification of this invention the inclined chutes are divided into sections or zones by the application to the inclined chute bottom of separately operative water discharge outlets; these outlets are located at vertically superposed zones. In this manner, superposed individual chute zones result which may be independently operated or may be functionally combined in case the chute is to be used as a single working unit.

This subdivision of the inclined dewatering chutes has proved to be particularly successful, as will be explained more in detail as this specification proceeds.

The invention will now be described with reference to the attached drawing which illustrates a preferred embodiment thereof.

In the drawings

Fig. 1 is a schematic vertical sectional view of an inclined dewatering chute constructed in conformity with this invention, Figs. 2 and 3 are similar vertical sectional views of further embodiments thereof, Fig. 4 is a sectional view on line 4 to 4 of Fig. 2.

As apparent from the drawing the dewatering chute shown in Fig. 1 is inclined at an acute angle relative to a vertical plane. The chute has lateral walls 1, an inclined bottom 5, a lower front wall 3 having a suitable closure, for instance, a slide closure and an upper wall provided with a charge supply opening 2 the arrow applied thereto illustrating the direction of the feed. A screen 6 is located on the inclined bottom 5.

The great advantage of this inclined chute for the separation of the water from the fine coal charge is clearly apparent from Fig. 1 which shows that the vertical dewatering path or distance "h" is always smaller than the total height "H" of the charge the dewatering path being denoted throughout the charge by the distance between the upper and lower rows of arrows.

A screen 7, as shown in Fig. 2, may be used in connection with a top wall to cover the upper surface of the charge. The water is discharged from the chute through lower outlet 8, Fig. 1.

The dewatering procedure may be further improved by a reduction of the air pressure.

For this purpose a water collector 18 located below the discharge end of the chute is connected with outlet 8 the connections within this vacuum device being schematically indicated by arrow provided lines the arrows indicating the direction of the water flow. The collector 18 connected through conduit 20 with the discharge vessel 21 is also connected with a vacuum pump 19. Valves 22, 23, 24 are located in the conduits connecting outlet 8 with collector 18 and the vacuum pump 19. The water separated from the charged coal fines 4 flows into collector 18 and through conduit 20 into the discharge vessel 21 the conduit 20 forming a barometric closure means. Valve 22 placed in the conduit between the chute and the collector 18 may be discontinuously operated to effect the loosening of the charge 4 and the cleaning of the bottom screens 6.

The great advantage of the inclined arrangement of the dewatering chute consists, as already stated, therein that the vertical dewatering path is always smaller than the vertical height of the charge; the shortcomings of the vertical dewatering towers or bunkers are hereby eliminated. The separation of the water may be further improved by the establishment of a vacuum in the above described manner.

In conformity with another feature of this invention the inclined chute is subdivided into a plurality of individually operative zones or sections; this is achieved, for instance, by the provision of several superposed dewatering outlets 9, 10, 11 in the bottom 5 of the chute, Fig. 2; in this manner, superposed zones or sections 13, 14, 15, 16 are created in the charge which may be independently operated.

Also with the subdivided inclined chute the vertical dewatering path in the charge is always smaller than its vertical height, whereby, as explained above, a quicker removal of the water and a better aeration of the charge is effected greatly improving the efficiency of the installation.

Any desired number of dewatering zones or sections may be located above each other. The screens 6 may be applied to a portion of the bottom 5 only and they may be step-shaped as indicated by dotted lines 6a in Fig. 3. Low dams 17 are located between and preferably at the upper end of the screens which dams direct the water flow into the outlets 9, 10, 11.

The combined water separation of the slimes in vacuo in combination with the individual operation of the chute zones is illustrated in Fig. 2; this may be properly effected by a preliminary water separation in the uppermost zone 13 or by commencement of the water removal in the lower zones as soon as the slimes have closed the screens of the respective zones against the entrance of air from above.

For this purpose the vacuum connection with the upper zone 13 through conduit 24 is interrupted and the valve 26 in the roundabout conduit 25 opened whereupon the water may freely flow from the discharge vessel 21. Upon filling the chute with the charge the upper zone may be also connected with the vacuum installation for a final water removal; hereupon the final water removal may be effected from the individual zones or from all zones simultaneously.

The great technical and economical advantages inherent in this invention are apparent. During the preliminary water removal in the upper zone the final dewatering of the charge from below is initiated simultaneously and independently upon the termination or interruption of the feed of the charge into the chute.

A further important advantage of the inclined dewatering chute is its working safety and insensibility to operational changes. The use of one single zone suffices eventually for the processing of the charge and this also applies if the grain structure or composition of the coal particles varies.

The chute may be easily adapted either to the normal or to the vacuum removal of the water; even if an interruption of the work, for instance, of the electric current supply occurs operational losses are thereby eliminated.

The multiple zone chute may also be used for preliminary dewatering work, for instance, as a throughgoing or as a roundabut flow chute. Several inclined chutes may be combined to form large scale installations; in this case, it might be advisable to operate the individual chutes from a common vacuum plant.

It is apparent from the above that the inclined chute answers all requirements of water separation from fine coal in every operational and economical respect.

This invention has been described with reference to a preferred embodiment and it will be understood that many variations and modifications thereof may be resorted to without departure from the scope of the invention as defined in the following claims.

I claim:

1. A device for dewatering coal slimes and comprising an inclined enclosed dewatering tower having parallel side walls, a bottom inclined at an angle greater than the angle of repose of the coal slimes, a vertical wall at its upper end and at its lower end, said upper end wall having therein charging openings for the coal slimes, the lower end portion of said lower end wall having a closeable discharge opening for the dewatered slimes, the lower end portion of said inclined bottom having a water discharge opening, a stationary dewatering screen supported upon and spaced above said inclined bottom, a top wall secured to the upper edges of said side walls and said vertical end walls, and a second screen spaced below said top wall and extending parallel thereto.

2. A device as recited in claim 1 wherein said bottom is provided with a plurality of dam elements extending across the upper surface of the bottom and projecting upwardly therefrom to said first-recited dewatering screen, said bottom having a plurality of water discharge openings therethrough each located adjacent and above a respective one of said dam elements.

3. A device as recited in claim 1 and having a vacuum means in communication with the space between said bottom and said first-recited dewatering screen for drawing off the water in the coal slimes by suction.

4. A device as recited in claim 1 wherein said bottom is provided with a plurality of additional water discharge openings at spaced intervals therealong, a vacuum pump, and selectively operable conduit means for connecting any one or more of said water discharge openings in the bottom to said vacuum pump.

ERICH RIEDEL.

References Cited in the file of this patent

UNITED STATES PATENTS

| Number | Name | Date |
|---|---|---|
| 262,702 | Sears | Aug. 15, 1882 |
| 2,071,998 | Buse | Feb. 23, 1937 |
| 2,462,878 | Logue | Mar. 1, 1949 |

FOREIGN PATENTS

| Number | Country | Date |
|---|---|---|
| 281,721 | Germany | Jan. 26, 1915 |
| 289,842 | Germany | Jan. 21, 1916 |

OTHER REFERENCES

Seeley W. Mudd, Coal Preparation, 1943, page 602.